UNITED STATES PATENT OFFICE.

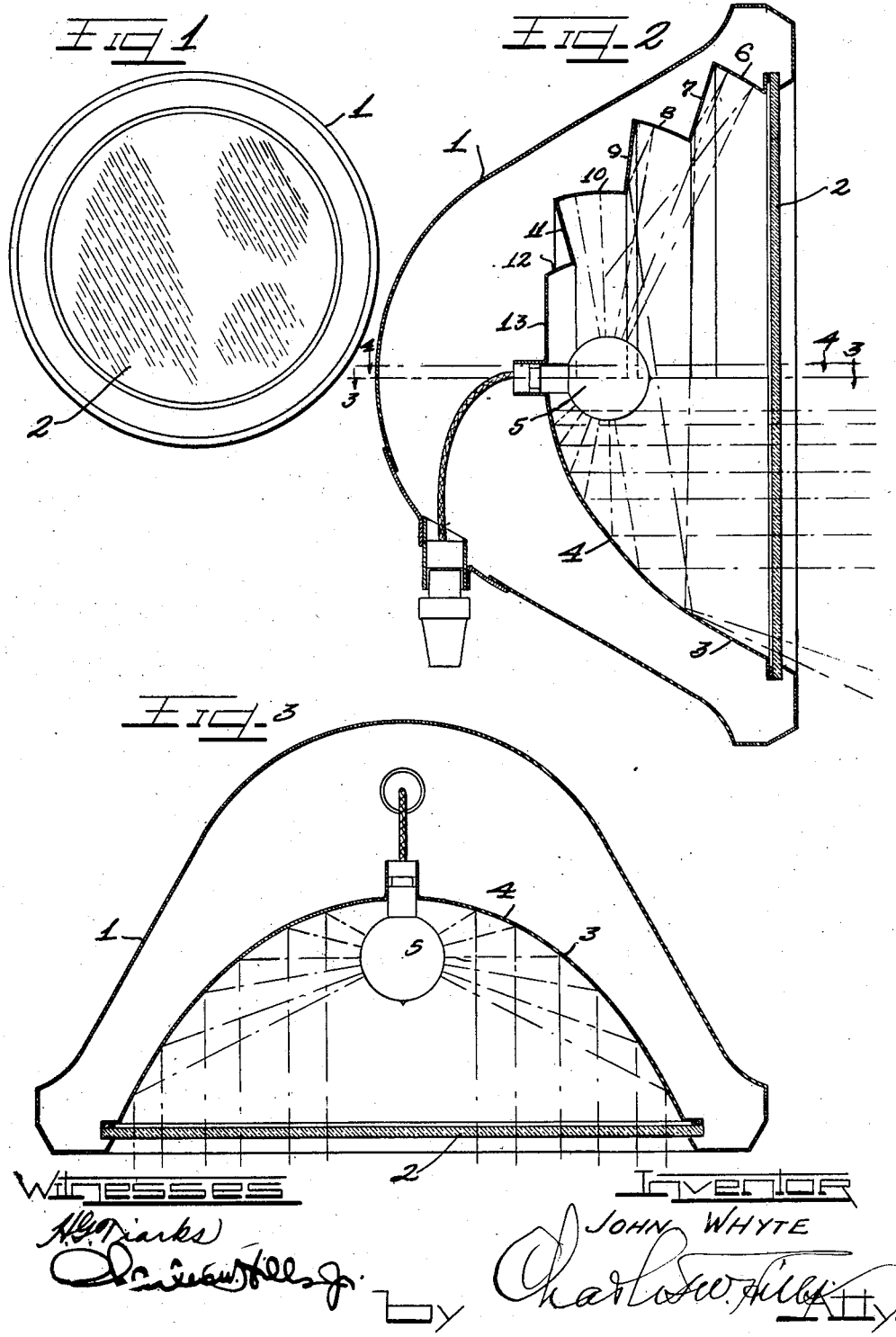

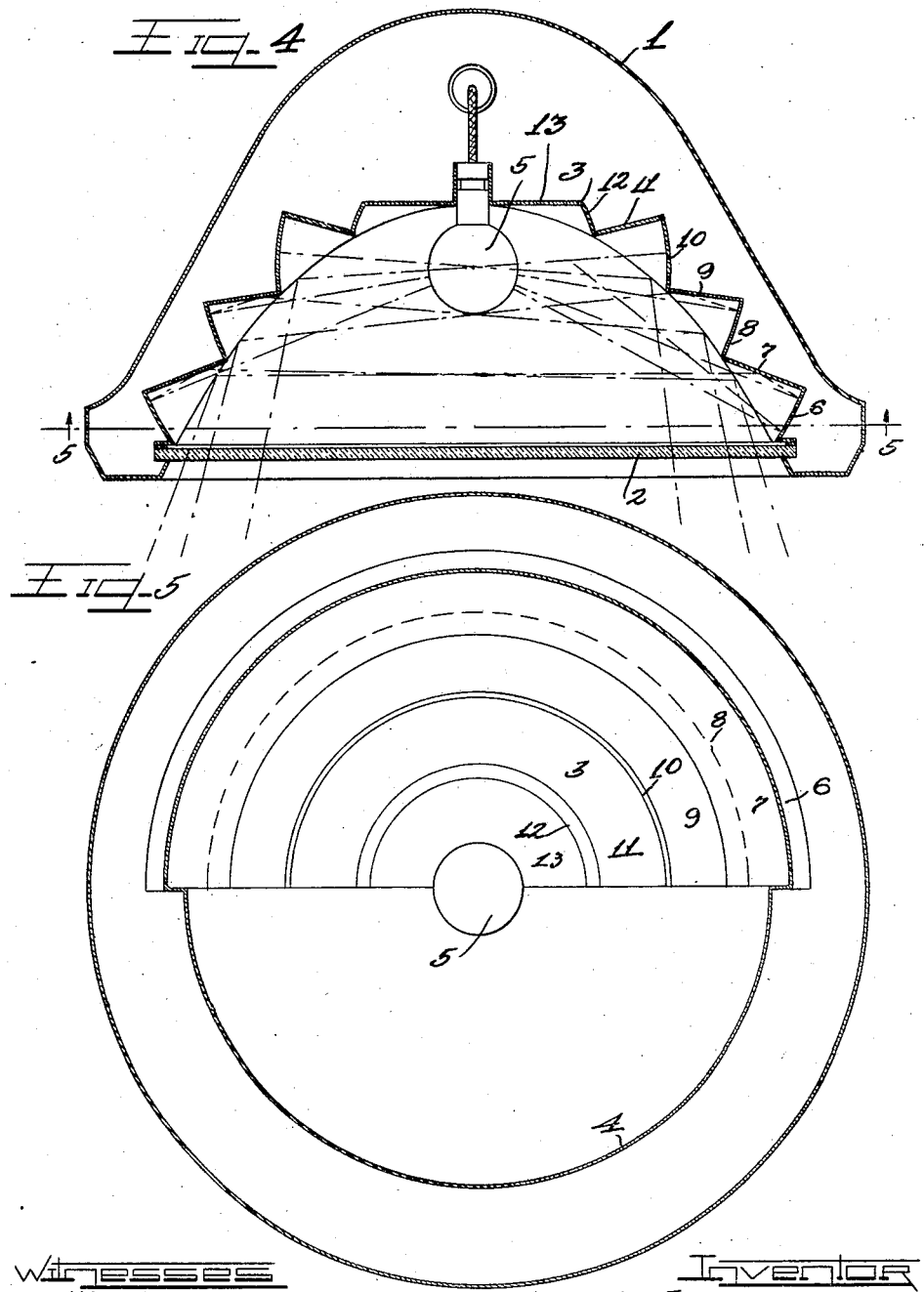

JOHN WHYTE, OF CHICAGO, ILLINOIS, ASSIGNOR TO WARNER-PATTERSON COMPANY, A CORPORATION OF ILLINOIS.

LIGHT-CONTROLLING DEVICE.

1,427,504.  Specification of Letters Patent.  Patented Aug. 29, 1922.

Application filed July 20, 1921. Serial No. 486,124.

*To all whom it may concern:*

Be it known that I, JOHN WHYTE a citizen of the United States, and a resident of the city of Chicago, in the county of Cook and State of Illinois, have invented certain new and useful Improvements in a Light-Controlling Device; and I do hereby declare that the following is a full, clear, and exact description of the same, reference being had to the accompanying drawings, and to the numerals of reference marked thereon, which form a part of this specification.

This invention relates to headlights such as are used upon automobiles.

It is an object of this invention to provide a reflector which will deliver the light in a beam that shall be mostly parallel but shall have some rays diverging downward and outward.

It is a further object of this invention to construct a reflector partly of parabolic and partly of other surfaces which shall produce the beam desired.

It is a further object of this invention to construct a reflector having certain portions of its surface ribbed in the form of spherical segments extending partway around the mirror.

It is a further object of this invention to so locate said spherical segments that their effect shall be to produce rays diverging downward and outward but not upward.

Other and further important objects of this invention will be apparent from the disclosures in the specification and the accompanying drawings.

The invention (in a preferred form) is shown on the drawings and hereinafter more fully described.

On the drawings:

Figure 1 is a front view of the headlight upon a smaller scale than the other figures.

Figure 2 is a central vertical section.

Figure 3 is a section upon the line 3—3 of Figure 2.

Figure 4 is a section upon the line 4—4 of Figure 2.

Figure 5 is a section upon the line 5—5 of Figure 4.

As shown on the drawings:

The headlight has a casing 1 and a front glass 2. Mounted within the casing in the usual way is a mirror 3, the lower half of which is parabolic, as shown at 4. A lamp 5 situated substantially at the focus of the parabolic part of the mirror is mounted and electrically connected in any usual or convenient way. The upper part of the mirror is made up of a series of bands each of which goes half way around the mirror. Each alternate one of these bands is a spherical surface. The bands in between are conical surfaces and the collection of bands has a general form somewhat resembling that of the lower parabolic half of the mirror.

The outermost of these bands 6 is a spherical segment, the center of which is on the axis of the parabolic mirror a little to the rear of the center of the lamp. The next band 7 is a conical surface. The next band 8 is a spherical segment whose center, like that of the segment 6, is on the axis of the parabolic mirror and to the rear of the lamp. The next band 9 is another conical surface. The next band 10 is a spherical segment the center of which is on the axis of the parabolic mirror and substantially at the center of the lamp. The next band 11 is a conical surface. All the conical surfaces are portions of cones which have for a common vertex the focus of the parabolic mirror. The next surface 12 is a spherical segment whose center coincides with that of the segment 10. The innermost band 13 is a plane surface passing behind the focus of the parabolic mirror.

In the operation of this device the light from the lamp 5 is reflected from the parabolic mirror 4 in a substantially parallel horizontal beam. The fact that the source of light is not a point will cause the beam to diverge somewhat but the divergency is slight and is about the same in all directions. The light which goes upward from the lamp and reaches the spherical mirror 6 is reflected towards a point slightly in the rear of its starting point. Such rays therefore pass through the lamp and strike against the parabolic mirror 4 at the rear of the lamp at an angle which causes them to be reflected somewhat downward instead of horizontal. Some of the light reflected from the spherical surface 6 will hit the conical surface 7 and be reflected so that it meets the lower mirror 4 in front of the lamp. Such rays will be reflected outward and downward, sloping downward somewhat more rapidly than the rays just described.

The reflection from the spherical mirror 8 is much the same, the rays reflected from it passing through the lamp to the parabolic mirror or striking against the conical mirror 9 to be again reflected at the parabolic mirror. The latter rays when they emerge are directed somewhat more downward than any rays heretofore described. The rays reflected from the spherical surface 10 and the spherical surface 12 return almost on the same line as that by which they arrived and are lost in the filament of the lamp. The form of the beam which emerges is not altered by such rays. The effect of the spherical surfaces 10 and 12 is to add slightly to the efficiency of the light. The conical surface 11 assists in returning to the lower parts of the parabolic mirror or to the filaments of the lamps any rays which may meet the spherical surface 10 obliquely.

The plain mirror 13 returns rays that emerge obliquely from the spherical mirror 12 to the parabolic mirror 4. A little light is reflected from the plain mirror 13 through the upper part of the glass 2 but it is small compared with the intensity of the beam as a whole.

The beam of light which is emitted by such an apparatus consists therefore principally of parallel horizontal rays forming a bundle which is wider than its vertical thickness. Below this beam there is a diverging beam consisting of the rays which were reflected obliquely downwardly. These are more intense near the horizontal part of the beam but become rapidly less so as the distance from the horizontal part of the beam increases. The illumination afforded by such a beam is therefore well distributed, being brighter upon the distant parts of the road than is usual with most headlights and being almost uniformly distributed along the surface of the ground from the distant part of the road to the vehicle. Very little light goes from this headlight into the air or onto the sides of the road.

I claim as my invention:

In a headlight, a reflector comprising a lower half of parabolic shape, and an upper half comprising spherical segments whose centers are on the axis of said parabola at or behind the focus, and conical surfaces between said segments, the cones having a common vertex at said focus, and a lamp situated substantially at the focus.

In testimony whereof I have hereunto subscribed my name in the presence of two subscribing witnesses.

JOHN WHYTE.

Witnesses:
CARLTON HILL,
JAMES M. O'BRIEN.